(12) United States Patent
Bohnen et al.

(10) Patent No.: US 12,744,432 B2
(45) Date of Patent: Sep. 22, 2026

(54) ELECTRIC MACHINE COMPRISING A STATOR AND A CONDUCTOR SUPPORT ARRANGED AT AN AXIAL END OF THE STATOR

(71) Applicant: Schaeffler Technologies AG & Co. KG, Herzogenaurach (DE)

(72) Inventors: Jens Bohnen, Wolfach (DE); Christian Morgen, Haueneberstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 192 days.

(21) Appl. No.: 18/713,888

(22) PCT Filed: Nov. 7, 2022

(86) PCT No.: PCT/DE2022/100821
§ 371 (c)(1),
(2) Date: May 28, 2024

(87) PCT Pub. No.: WO2023/093935
PCT Pub. Date: Jun. 1, 2023

(65) Prior Publication Data

US 2025/0030319 A1 Jan. 23, 2025

(30) Foreign Application Priority Data

Nov. 29, 2021 (DE) ........................ 102021131197.7

(51) Int. Cl.
*H02K 9/197* (2006.01)
*H02K 3/50* (2006.01)

(52) U.S. Cl.
CPC ............... *H02K 9/197* (2013.01); *H02K 3/50* (2013.01); *H02K 2203/09* (2013.01)

(58) Field of Classification Search
CPC ....... H02K 9/197; H02K 3/50; H02L 2203/09
See application file for complete search history.

(56) References Cited

U.S. PATENT DOCUMENTS 3,742,595 A 7/1973 Lykes
2013/0069458 A1* 3/2013 Stallone ................ H02K 3/505 310/71
2014/0139061 A1* 5/2014 Gutjahr ................. H02K 9/197 310/86

FOREIGN PATENT DOCUMENTS

EP 1271747 A1 * 1/2003 ............ H02K 5/203
GB 872743 A 7/1961
GB 2500040 A 9/2013

OTHER PUBLICATIONS

English translation of EP-1271747-A1. (Year: 2003).*

* cited by examiner

*Primary Examiner* — Sean Gugger
(74) *Attorney, Agent, or Firm* — Price Heneveld LLP

(57) ABSTRACT

The disclosure relates to an electric machine comprising a stator and a conductor support arranged at an axial end of the stator, wherein the conductor support comprises a ring-shaped sealing section and a ring-shaped or ring-segment-shaped conductor support section, wherein the sealing section has a first seal axially facing the stator and a second seal axially facing away from the stator, wherein the first seal is in contact with a sealing element arranged on the stator and sealing the stator against a radially adjacent air gap, and at least sections of the second seal are in contact with at least one cover at least partially surrounding the conductor support section and/or the axial end of the stator.

18 Claims, 13 Drawing Sheets

ELECTRIC MACHINE COMPRISING A STATOR AND A CONDUCTOR SUPPORT ARRANGED AT AN AXIAL END OF THE STATOR

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/DE2022/100821, filed on Nov. 7, 2022, designating the United States of America, which in turn claims the benefit of priority under 35 U.S.C. §§ 119, 365 of German Patent Application No. 102021131197.7, filed Nov. 29, 2021, the contents of which are relied upon and incorporated herein by reference in their entirety.

FIELD OF THE DISCLOSURE

The disclosure relates to an electric machine comprising a stator and a conductor support arranged at an axial end of the stator.

BACKGROUND OF THE DISCLOSURE

Electric machines have a wide range of applications in technology and can be used, for example, as traction motors in motor vehicles. Since a comparatively high output of the electric machine is required, it may be necessary to cool the electric machine during operation. This can be implemented, for example, by cooling the stator of the electric machine using a liquid cooling system. It may be desirable to limit the cooling to the stator so that the rotating rotor of the electric machine does not come into contact with the liquid coolant. For this purpose, the stator in the electric machine must be sealed against the rotor or against the air gap between the rotor and the stator. Furthermore, the stator must also be sealed from the environment of the electric machine.

For this purpose, different types of sealing elements can be provided on the electric machine. These sealing elements seal the stator, for example from open stator grooves directed towards the rotor in a laminated core of the stator. This makes it possible for the stator windings arranged in the stator grooves to be cooled via a cooling liquid, which cannot penetrate into the air gap or the rotor due to the sealing element.

A sealing element extending axially through the electric machine must be sealed to other components of the electric machine on the two axial face sides of the stator. For example, the sealing element can be connected to a housing and/or to bearing shields fixed to the housing. However, since additional components of the electric machine, such as busbars for connecting the stator winding or the like, also have to be arranged in the area of the face sides, a compact and, in particular, easy-to-install seal is needed for the electric machine.

SUMMARY OF THE DISCLOSURE

The disclosure is therefore based on the object of disclosing an improved electric machine, which, in particular, enables improved sealing of a stator of the electric machine.

To achieve this object, an electric machine is provided in accordance with the disclosure, in which the conductor support comprises a ring-shaped sealing section and a ring-shaped or ring-segment-shaped conductor support section, wherein the sealing section has a first seal axially facing the stator and a second seal axially facing away from the stator, wherein the first seal is in contact with a sealing element arranged on the stator and sealing the stator against a radially adjacent air gap, and at least sections of the second seal are in contact with at least one cover at least partially surrounding the conductor support section and/or the axial end of the stator.

The conductor support, which is arranged at an axial end of the stator, can thus advantageously fulfill a plurality of functions. On the one hand, the sealing section of the conductor support serves to seal the stator of the electric machine, in particular from the rotor space. For this purpose, the sealing section comprises the first seal axially facing the stator, which is in contact with the sealing element and rests against the sealing element which is arranged in particular inside the stator and sealing the stator against the air gap. The sealing via the first seal of the sealing section takes place on a first axial face side of the stator. Alternatively, a structure of the electric machine is also possible in which the sealing element seals the stator against an air gap located radially on the outside. In this case, sealing is also achieved by the seal of the sealing section in the axial direction on one face side of the stator.

The sealing element can in particular be a slot tube, which is in contact with the inner circumference of the particularly hollow cylindrical stator and in particular closes the inwardly open stator grooves from the air gap. A coolant used to cool the stator and in particular the stator windings cannot therefore escape into the air gap. The rotor, which is separated from the stator by the air gap, can thus rotate unaffected by a coolant, wherein churning losses in particular can be avoided during operation.

As an alternative to a slot tube, other sealing elements, for example an insulating coating, an adhesive coating and/or a sealing film or similar, can also be used. The sealing element can also provide electrical insulation between the stator and rotor. By providing the first seal on the sealing section of the conductor support, a seal can be created with the sealing element during assembly of the electric machine. The first seal can come into contact in particular with the inner diameter or with the end face of the sealing element. It is also possible for the seal to be in contact with the sealing element from the radial outside. At the opposite, second end of the stator, the stator is also sealed via a further sealing arrangement, which is also in contact with the sealing element.

The second seal of the sealing section creates a sealing connection to one or a plurality of covers, which at least partially surround the at least one conductor support section and/or the axial end of the stator. In this way, the liquid-filled wet space that at least partially surrounds the stator can also be closed off at the axial end of the stator through the at least one cover. This sealing connection can also be created in a simple manner during assembly of the electric machine by providing the second seal on the side of the conductor support facing away from the stator.

In addition, the conductor support section of the conductor support also advantageously fulfills the function of positioning electrical conductors such as busbars, which are required for connecting the windings of the stator windings, in a way that is fixed to the housing. Depending on the number of grooves in the stator and the winding method used to insert the stator winding into the stator, there is a plurality of different line strands. These can be connected to one another via the conductor support section of the conductor support, or via conductors arranged in the conductor support section, and in particular can be combined to form a plurality of phase outputs of the electric machine.

Depending on which winding scheme is used to generate the stator winding, the ends of the winding strands to be connected can be arranged around the entire circumference of the electric machine or only around a partial area of the circumference of the stator. Accordingly, a ring-shaped or ring-segment-shaped conductor support section can be used to arrange the conductors necessary for connecting the ends of the winding strands on the electric machine.

Furthermore, the conductor support with the ring-shaped sealing section, which has a comparatively large contact area with other components of the electric machine, advantageously enables precise positioning of the conductor support and thus also precise alignment of the sealing section and the conductor support section when mounting the electric machine. This can ensure that the first seal and the second seal each form a sealing connection with the sealing element or the at least one cover and that the conductor support section has the correct orientation in relation to the windings to be connected. This facilitates the association between the ends of the winding strands and the associated conductors on the conductor support section, so that, for example, their connection can be made by welding directly and without correcting the orientation of the components to be connected.

By integrating several functions into the conductor support, namely both the function of arranging and fixing the conductors in the conductor support section and the provision of sealing connections via the sealing section, the number of components of the electric machine can advantageously be reduced. This has an advantageous effect on the costs of producing the electric machine and reduces the effort involved in mounting it.

According to the disclosure, it can be provided that the second seal is completely in contact with a cover element surrounding the conductor support section and at least a section of the axial end of the stator, or that the second seal is in contact with a section on a cover element covering the conductor support section and with at least one further section on a housing of the electric machine and/or on a bearing shield of the electric machine. Both a cover element and the housing and the bearing shield can serve as a cover for at least a section of the axial end of the stator and/or for the conductor support section. Both variants enable complete sealing of the stator or a wet space surrounding the stator at the axial end of the stator on which the conductor support is arranged. The wet space is sealed at the axial end both from the rotor and from the environment of the electric machine, so that a coolant used to cool the stator, for example an insulating cooling oil or similar, remains within the wet space.

The conductor support can thus advantageously provide sealing functional surfaces, which enable both a seal against the sealing element in the stator and against the cover or against the housing, the bearing shield and/or a cover element, which separately covers the conductor support section. The direct contact between the second seal on the side of the sealing section axially facing away from the stator with a cover, the bearing shield and/or with the housing of the electric machine also advantageously results in a centering of the sealing element inside the electric machine when mounting the electric machine.

In an embodiment of the disclosure, it can be provided that the stator has at least one stator winding, wherein a wet space is sealed at the axial end of the stator through the sealing element and the sealing section of the conductor support, which wet space comprises the stator winding and at least one or a plurality of conductors arranged on the conductor support section. The conductors arranged on the conductor support section can in particular be designed as busbars.

The advantage of such a wet space is that the liquid cooling system of the stator can also be utilized for the conductors on the conductor support. Due to the sealing by the axially offset seals of the sealing section, the conductors of the conductor support section can be arranged in a simple manner within the wet space, particularly when the conductor support section is arranged axially between the first seal and the second seal. This advantageously enables the heat generated during operation of the electric machine to be dissipated directly. This increases machine efficiency and allows the use of less heat-resistant and therefore cheaper materials, which means that the electric machine can advantageously be manufactured more cost-effectively.

According to the disclosure, it can be provided that the first seal and the second seal are ring-shaped and/or that the first seal and the second seal are each arranged in a ring-shaped groove of the sealing section. The first seal and the second seal extend in particular in the circumferential direction of the electric machine or in a plane orthogonal to the axial direction of the electric machine. The sealing element sealing the stator, which in particular has a hollow cylindrical shape, can also have a cylindrical sealing surface running in the circumferential direction of the electric machine and arranged at the axial ends of the stator, which can thus be arranged in direct contact with the first seal of the sealing section along its entire circumference. Accordingly, the second, ring-shaped seal at the opposite axial end of the conductor support section, i.e., towards the outer end of the machine, enables an at least substantially ring-shaped seal of the wet space surrounding the stator.

The first seal may have a larger diameter than the second seal. Accordingly, the ring-shaped sealing section of the conductor support can have a section with a larger outer diameter and/or a larger inner diameter on a first side axially facing the stator than on a second section on the second side axially facing away from the stator, on which the second seal is arranged.

The first seal and the second seal are arranged in particular in a ring-shaped groove of the sealing section, wherein the grooves also each extend in the circumferential direction of the electric machine or in a plane orthogonal to the axial direction of the electric machine. The groove of the first seal and the second seal are arranged offset from one another in the axial direction of the electric machine. The first seal and the second seal can in particular be arranged on an outer circumference of the ring-shaped sealing section. The first seal can be in contact with the sealing element radially from the inside. Correspondingly, the second seal can also provide a radial seal against a cover of the conductor support section and/or a cover of the axial end of the stator, wherein the second seal is also radially in contact from the inside with at least one corresponding sealing surface of the at least one cover. Alternatively, the first seal can also be in contact radially from the outside with the sealing element, for which purpose it can be arranged, for example, on an inner circumference of the ring-shaped sealing section.

According to the disclosure, the first seal and the second seal can each be designed as a sealing ring, in particular as an O-ring, as a metered seal or as an injection-molded seal. The first and/or the second seal can each be designed as a rubber O-ring. Differently shaped sealing rings with a non-circular cross-section can also be used for the first seal and/or the second seal. Alternatively, the first seal and/or the second seal can each also be formed by injection-molding or metering of a sealing compound, in particular into a ring-shaped groove of the sealing section of the conductor support.

According to the disclosure, it can be provided that the conductor support section and the sealing section consist of an electrically insulating material, in particular a plastic. In this context, electrically insulating means that the conductor support section and the sealing section each have a sufficiently low electrical conductivity, to insulate the voltages applied to the stator during operation from a housing and/or a bearing shield and to insulate the conductors carrying the different potentials from each other, in particular in the conductor support section.

Due to their function, the different phase outputs are at different electrical potentials during operation of the electric machine. The conductors, which are used to connect the winding strands assigned to the individual phases, are spatially comparatively close to one another in the conductor support section, so that adequate insulation with electrically insulating materials is required. Advantageously, the provision of a conductor support section made of an electrically insulating material thus enables simple electrical insulation of the conductors from one another and electrical insulation from other components of the electric machine, in particular from a housing and/or a bearing shield, each of which can be made of a metallic material.

The electrically insulating sealing section enables sufficient insulation distances between a winding head protruding axially from the stator and a rotor as well as other conductive components, such as a housing and/or a bearing shield. Both the sealing section and the conductor support section can be made of an electrically insulating material, in particular in one piece as a single component. A cover element at least partially surrounding the conductor support section, which can be in contact with the second seal in sections, can also be designed to be electrically insulating, to provide additional insulation of the conductors arranged in the conductor support section against other machine components, in particular a housing and/or a bearing shield. This cover element can in particular be designed as a separate component so that the conductor support section and the conductors arranged therein are accessible during assembly.

Advantageously, the conductor support section and the sealing section can be made from a plastic, whereby their electrically insulating properties can be produced in a simple manner. Furthermore, the production from plastic enables simple production and in particular the possible formation of ring-shaped grooves in the sealing section for receiving the first and second seals. The conductor support section and the sealing section can be manufactured, for example, by means of a plastic injection molding process, in particular by producing a one-piece plastic injection molded part, which forms both the conductor support section and the sealing section.

According to the disclosure, it can be provided that the conductor support section has a plurality of slot-shaped, radially adjacent receiving sections, wherein at least one busbar is arranged in each of the receiving sections. The receiving sections are in particular circular or circular-segment-shaped, corresponding to the shape of the conductor support section, wherein they extend accordingly over the entire or only a section of the circumference of the stator of the electric machine.

The slot-shaped receiving sections can be open at an axial end of the conductor support section, in particular the axial end facing the second seal, so that busbars can be inserted into the receiving sections. By arranging the busbars in a separate, slot-shaped receiving section, the busbars, in particular each carrying a different phase potential, can be insulated. In addition to the busbars carrying the phase potentials, a star point rail can also run in the conductor support section, which is connected to the phases of the electric machine to form a star connection of the phases.

According to the disclosure, it can be provided that two adjacently arranged receiving sections are each separated by a web section extending in the axial direction, wherein the web section protrudes in the axial direction over the busbars arranged in the receiving sections. The protrusion of the web section beyond the busbars in the axial direction increases an air gap and a creepage distance between the busbars and thus improves the electrical insulation of the busbars from one another. Advantageously, voltage flashovers between the conductors in the conductor support section and/or between the conductors and other components of the electric machine can be avoided.

In an exemplary embodiment of the disclosure, it can be provided that the conductor support section has at least one phase connection, in particular three phase connections. The phase connections are connected to the phase windings of the stator winding in particular via conductors or the busbars in the conductor support section. The stator of the electric machine can be powered via the phase connections, in particular with a three-phase alternating current.

Furthermore, the disclosure relates to a conductor support for an electric machine, wherein the conductor support comprises a ring-shaped sealing section and a ring-shaped or ring-segment-shaped conductor support section, wherein the sealing section has a first seal and a second seal, wherein the first seal and the second seal are arranged axially offset on the sealing section.

According to the disclosure, the first and second seals of the conductor support can be ring-shaped and/or can each be arranged in a ring-shaped groove of the sealing section. According to the disclosure, it can be provided that the first seal and the second seal are each designed as a sealing ring, in particular as an O-ring, as a metered seal or as an injection-molded seal.

According to the disclosure, the conductor support section and the sealing section of the conductor support can consist of an electrically insulating material, in particular a plastic. According to the disclosure, the conductor support section can have a plurality of slot-shaped, radially adjacent receiving sections, wherein at least one busbar is arranged in each of the receiving sections. In an exemplary embodiment of the disclosure, it can be provided that two adjacently arranged receiving sections are each separated by a web section extending in the axial direction, wherein the web section protrudes in the axial direction over the busbars arranged in the receiving sections.

According to the disclosure, the conductor support section can have at least one phase connection, in particular three phase connections.

All the advantages and configurations described above in relation to the electric machine apply correspondingly to the conductor support according to the disclosure and vice versa.

BRIEF DESCRIPTION OF THE DRAWINGS

The disclosure is explained below on the basis of exemplary embodiments with reference to the drawings. The drawings are schematic representations, in which.

DETAILED DESCRIPTION

Figure 1:
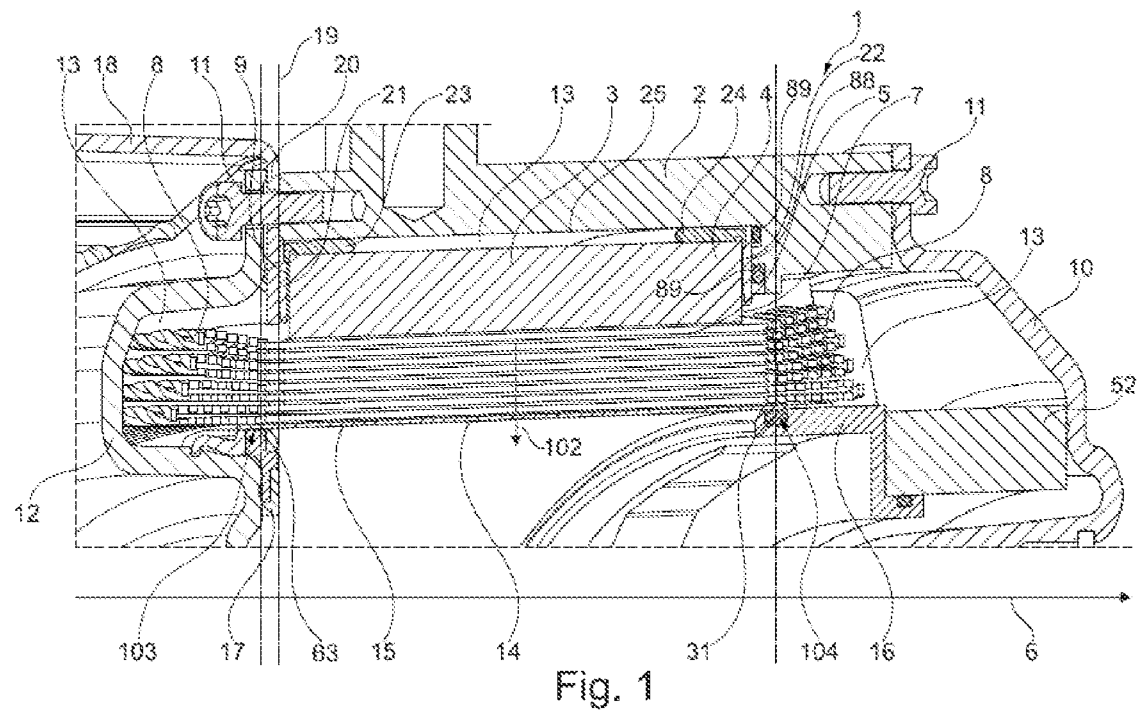
FIG. 1 shows an exemplary embodiment of an electric machine in a perspective sectional view.

FIG. 1 shows an exemplary embodiment of an electric machine 1 according to the disclosure. The electric machine 1 comprises a housing 2, in which a stator 3 is received. The stator 3 comprises a stator core 4, for example formed from a laminated core, and a stator winding 5 comprising several phase windings, which extends through the stator core 4. The housing 2 and the stator 3 are arranged coaxially along a longitudinal axis 6 extending in the axial direction of the electric machine 1. Furthermore, the housing 2 and the stator 3 are each designed to be hollow cylindrical in this exemplary embodiment.

For the purposes of the disclosure, the term "hollow cylindrical" also includes shapes that are substantially hollow cylindrical. For example, substantially hollow cylindrical shapes can have an uneven inner and/or outer cladding surface. A slight cone shape, i.e., a radius that changes slightly along the axial length, is also possible.

The conductors of the stator winding 5 extend out of the stator 3 at a first axial end 7 and form one or a plurality of winding heads 8 there. The conductors of the stator winding 5 also form one or a plurality of winding heads 8 at a second axial end 9 of the stator 3. The stator winding 5 can be designed as a distributed winding, for example as a wave winding. Other designs of the stator winding 5 are also possible. The number and shape of the winding heads 8 at the axial ends 7, 9 of the stator 3 is particularly dependent on the winding pattern of the stator winding 5.

At the first axial end 7 of the stator 3, which is on the right side in FIG. 1, the electric machine 1 comprises a bearing shield 10, which is attached to the housing 2, for example via a plurality of screw connections 11. The bearing shield 10 limits the electric machine 1 to the outside. In addition, at the second axial end 9 of the electric machine 1, which is on the left side in FIG. 1, a bearing shield 12 is attached to the housing 2 via a plurality of screw connections 11.

The stator 3 of the electric machine 1 comprises a liquid cooling system. For this purpose, the stator 3 is at least partially surrounded in a wet space 13 inside the electric machine 1. The wet space 13 is at least partially delimited by the stator core 4 and in the area of the winding heads 8 by the bearing shields 10, 12. The provision of the wet space 13 enables the flow of a particularly liquid coolant through the stator winding 5, whereby the coolant flows in particular through the grooves in the stator core 4, in which the conductors of the stator winding 5 are arranged, and/or between the conductors of the stator winding 5.

In the air gap 14 inside the electric machine 1, which separates the stator 3 from a rotor (not shown here) of the electric machine 1, the wet space 13 is delimited by a sealing element 15. The sealing element 15 seals the grooves of the stator core 4 that are open radially through the stator 3 and towards the air gap 14, so that a cooling liquid located in the wet space 13 can flow along the stator winding 5 without escaping into the air gap 14. The wet space 13 or the liquid-cooled stator 3 can thus advantageously be sealed off from a rotor of the electric machine 1, so that the rotor does not come into contact with the coolant when the electric machine 1 is in operation. This makes it possible to avoid churning losses, which advantageously increases the efficiency of the electric machine 1.

A conductor support 16 is arranged at the first axial end 7 of the stator 3 to seal the wet space 13. The conductor support 16 enables sealing against the sealing element 15 and against at least one cover arranged in the area of the first axial end 7 of the stator 3, in particular a separate cover element 52, the bearing shield 10 and/or a section of the housing 2. The structure of the conductor support 16 is explained in more detail below with reference to FIGS. 3 to 6.

The sealing element 15 can be designed as a slot tube, for example made of a glass fiber reinforced plastic. Alternatively, another version of the sealing element 15 can also be used, for example a version as an insulating coating, as an adhesive coating and/or as a sealing film. The sealing element 15 can have a thickness between 0.5 mm and 1 mm, for example 0.7 mm.

At the second axial end 9 of the stator 3, sealing against the sealing element 15 is achieved via a sealing arrangement 17, which is attached to the bearing shield 12. The structure of the sealing arrangement 17 is explained in more detail below with reference to FIGS. 8 to 11.

A transmission connection element 18 is also provided at the second axial end 9 of the stator 3, which enables the electric machine 1 to be connected to a transmission. In addition, the transmission connection element 18 can at least partially house a transmission coupled to the electric machine 1. The transmission connection element 18 is explained in more detail below with reference to FIGS. 12 and 13.

The stator 3 is connected to an attachment section 20 of the transmission connection element 18 inside the electric machine 1 along an attachment plane 19. The stator 3 is connected by bonding the stator core 4 to the attachment section 20 of the transmission connection element 18. For this purpose, the stator core 4 comprises an insulation ring 21 at its first axial end 7, which is firmly connected to the stator core 4 and via which the stator 3 can be bonded to the attachment section 20 of the transmission connection element 18. The insulation ring 21 is in contact with an axial end face of the stator core 4. The stator 3 also has an insulation ring 22 at the opposite, first axial end 7 of the stator 3, which is arranged on an axial face side of the stator core 4.

In the radial direction, the stator 3 is supported on an inside of the hollow cylindrical housing 2 via two centering sleeves 23, 24. The centering sleeves 23, 24 are designed as ring-shaped plastic elements and enable the stator 3 to be inserted and aligned or positioned in the housing 2. A gap remaining between the stator core 4 and the housing 2 between the centering sleeves 23, 24 ensures sufficient air and creepage distances for the insulation of the stator 3 from the housing 2. In an alternative embodiment, it is possible that the gap is part of the wet space 13 and an electrically insulating coolant also flows therethrough.

The insulation rings 21, 22 and the centering sleeves 23, 24 can be designed as separate, ring-shaped components. It is also possible that the insulation ring 21 and the centering sleeve 23 as well as the insulation ring 22 and the centering sleeve 24 are each designed as a common component with an L-shaped cross-section. The insulation rings 21, 22 and the centering sleeves 23, 24 consist of an electrically insulating material, in particular a plastic, and can be manufactured, for example, by means of an injection molding process.

An electrically insulating, radial support of the stator 3 on the housing 2 is thus made possible via the centering sleeves 23, 24. The insulation ring 21 enables the stator 3 to be axially supported at the second axial end 9 of the stator 3, in particular against the transmission connection element 18 which is mountedly fixed to the housing 2. The insulation ring 22 enables the stator 3 to be axially supported at the first axial end 7 of the stator 3, in the present case against a section 88 of the housing 2 pointing radially inwards. One or a plurality of sealing elements 89 can be provided on section 88, which enable the wet space 13 to be sealed on the contact surface between the stator 3 and the housing 2 along the section 88. The insulation rings 21, 22 and/or the centering sleeves 23, 24 can be attached to the stator core 4 by bonding, for example using an epoxy resin.

The insulating support of the stator 3 in the housing 2 advantageously makes it possible to dispense with insulating materials such as insulating paper or the like arranged in the grooves of the stator 3. The space thus gained can be used for the flow of the coolant, for example an insulating cooling oil, through the grooves or through the stator winding 5, so that it is advantageous to realize the cooling channels without a reduced sheet metal cross-section of the stator core 4 and without reduced copper cross-sections of the stator winding 5. Furthermore, this insulation makes it possible to alternatively increase the filling factor in the case of an uncooled stator 3.

Figure 2:
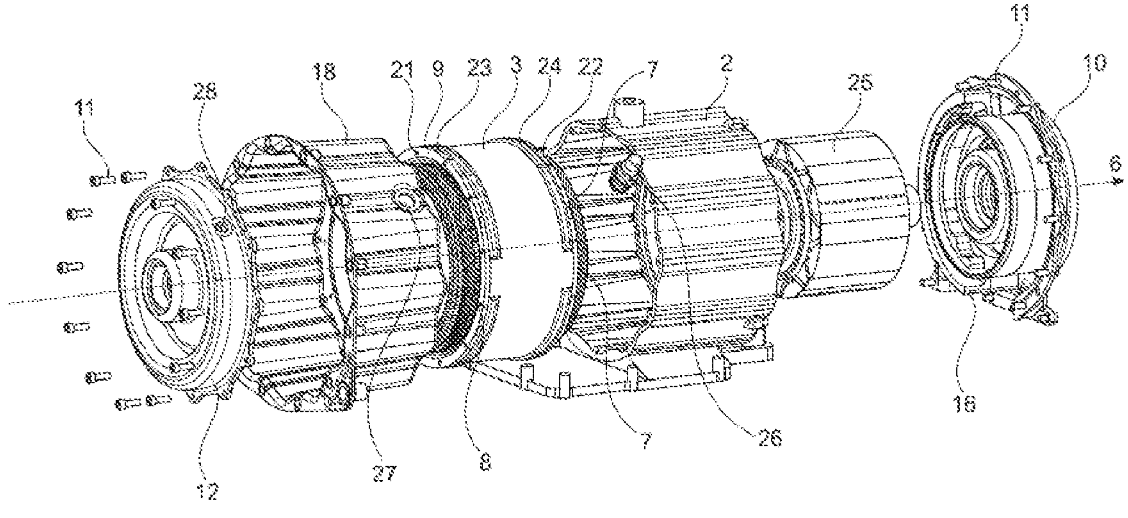
FIG. 2 shows an exploded view of the exemplary embodiment of the electric machine according to the disclosure.

FIG. 2 shows the structure of the electric machine 1 in an exploded view. In addition to the components of the electric machine 1 already described with reference to FIG. 1, the rotor 25 of the electric machine 1 is also shown. The air gap 14 is formed between the rotor 25 and the radially inner circumference of the stator 3 formed by the sealing element 15.

Also shown here is a connection element 26 designed as a coolant connection piece, which can be connected to a corresponding opening 27 in the transmission connection element 18 and a corresponding opening 28 in the bearing shield 12 in order to enable a coolant supply to the stator 3 or to the wet space 13 surrounding the stator 3. One or more further connectors (not shown) can also be arranged on the electric machine 1, via which a supply or removal of coolant to the wet space 13 is also possible.

The electric machine 1 can, for example, be designed for use as a traction electric motor in a motor vehicle. For this purpose, the electric machine 1 can be designed to generate a mechanical power between 50 kW and 500 kW, in particular between 100 kW and 200 kW, for example 150 kW.

Figure 3:
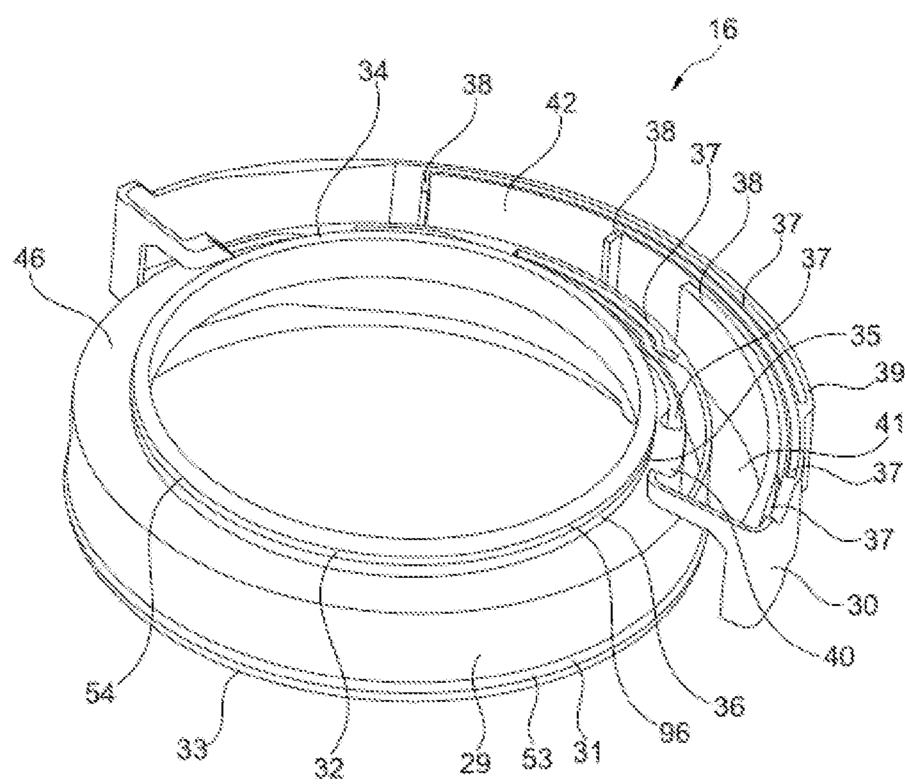
FIG. 3 shows an exemplary embodiment of a conductor support according to the disclosure of the electric machine according to the disclosure.

FIG. 3 shows a detailed view of the conductor support 16 of the electric machine 1. The conductor support 16 comprises a ring-shaped sealing section 29 and a ring-segment-shaped conductor support section 30. The sealing section 29 has a first seal 31 and a second seal 32. The first seal 31 is arranged at a first axial end 33 of the sealing section 29 and faces axially towards the first axial end 7 of the stator 3 in the mounting position of the conductor support 16. The second seal 32 is arranged at the opposite, second axial end 34 of the sealing section 29, so that it is arranged on the side of the conductor support 16 facing away from the stator 3, that is to say facing the bearing shield 10 in the mounting position of the conductor support 16.

The first seal 31 and the second seal 32 are each arranged on an outer circumference of the sealing section 29. The sealing section 29 has a smaller outer diameter at its second axial end 34 or on an outer cylindrical surface 96 in the area of the second seal 32, so that the second seal 32 also has a smaller diameter than the first seal 31. The section of the sealing section 29 adjacent to the second axial end 34, at the first axial end 33 of which the first seal 31 is arranged, correspondingly has a cylindrical surface 95 with a larger outer diameter than the cylindrical surface 96.

The first seal 31 and the second seal 32 are each designed as an O-ring and are inserted into a ring-shaped groove 53 or 54 of the sealing section 29, respectively. Corresponding to the shape of the first seal 31 and the second seal 32, the grooves 53, 54 also run ring-shaped around the outer circumference of the sealing section 29. In addition to being designed as an O-ring, the first seal 31 and the second seal 32 can also be designed as an injection-molded seal, which can be created, for example, by injecting or metering a sealing compound into the grooves 53, 54.

With the first seal 31, the sealing section 29 of the conductor support 16 is in contact with the sealing element 15, which seals the stator 3 against the radially inner air gap 14. The second seal 32 is in contact at least in sections with a cover element (not shown here), which surrounds the conductor support section 30 after the conductor support 16 has been arranged in the electric machine 1. The cover element is also ring-segment-shaped and extends substantially over the same circular segment as the conductor support section 30, so that the second seal 32 with a section 35 is in contact with the cover element (not shown in FIG. 3). With the remaining section 36 of the ring-shaped second seal 32, the sealing section 29 is in contact with the bearing shield 10, which at least partially surrounds the second axial end 9 of the stator 3.

It is possible for the conductor support section 30 to extend over a larger or a smaller part of the circumference of the stator 3 or the electric machine 1. A ring-shaped design of the conductor support section 30 is also possible. The sections 35, 36 with which the sealing section 29 is in contact with the cover element or the bearing shield 10 of the electric machine 1 correspondingly increase or decrease in size. In addition or as an alternative to direct contact between the second seal 32 and the bearing shield 10, direct contact between the second seal 32, or its second section 36, and a section of the housing 2 can also be provided.

The sealing section 29 and the first seal 31 and the second seal 32 of the conductor support 16 ensure that the wet space 13 of the electric machine 1 is sealed. The coolant flowing around the stator 3 is thus held within the wet space 13, so penetration or leakage of the coolant into the air gap 14 and/or to the rotor 25 is thus avoided. Escaping of the coolant from the interior of the electric machine 1 to the outside can also be prevented by the conductor support 16, or its sealing section 29, in the area of the first axial end 7 of the stator 3.

The conductor support section 30 of the conductor support 16 comprises a plurality of slot-shaped ring-segment-shaped receiving sections 37 running radially adjacent to one another. A busbar (not shown here) is arranged in the receiving sections 37 in the mounting position of the conductor support 16. The individual phase windings of the stator winding 5 can be interconnected via the busbars.

Two adjacently arranged receiving sections 37 are each separated by a web section 38. The web section 38 is designed to be longer in the axial direction than the busbars in the receiving sections 37, so that an air gap and a creepage distance between the axial end faces of adjacently arranged busbars is increased. In this way, the insulation between the busbars arranged in the receiving sections 37 can be improved. In this case, receiving sections 37 and web sections 38 are provided both in a radially outer area 39 and in a radially inner area 40 of the conductor support section 30, so that the busbars required for connecting the stator winding 5 can be arranged radially on the inside and radially on the outside of a receiving space 41. The receiving space 41 serves to receive a part of the winding head 8 at the first axial end 7 of the stator 3. An axial support surface 46 is provided between the first seal 31 and the second seal 32, via which the conductor support 16 can come into contact axially, for example, with a section of the housing 2 and/or with the bearing shield 10.

Figure 4:
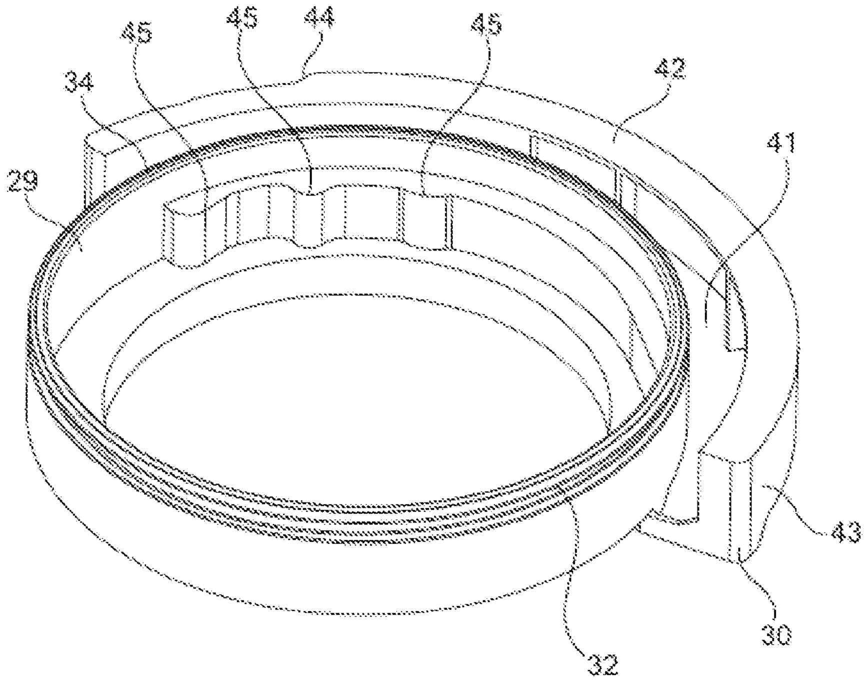
FIG. 4 shows a view of the back of the conductor support according to the disclosure facing the stator.

FIG. 4 shows a view of the side of the conductor support 16 facing the stator 3. The conductor support section 30 has an axial contact surface 42 with which the conductor support 16 is in contact with an end face of the stator 3 at its first axial end 7. Alternatively, axial contact with a section of the housing 2 extending into the corresponding area is also possible, wherein this section is able to be machined in particular to form a defined alignment of the arranged conductor support 16.

The radially external section 43 of the conductor support section 30 has the shape of a cylindrical cladding segment and serves as a radial centering surface for arranging the conductor support 16 on the housing 2 of the electric machine 1. In order to facilitate the positioning of the conductor support 16 when mounting the electric machine 1, the conductor support 16 can also have an anti-rotation device, which can be designed, for example, as a cutout 44 in the circumferential direction. Centering aids 45, which are designed for example as bulges, can also be provided on other sections of the conductor support 16, for example on the inner circumference at the second axial end 34 of the sealing section 29.

Figure 5:
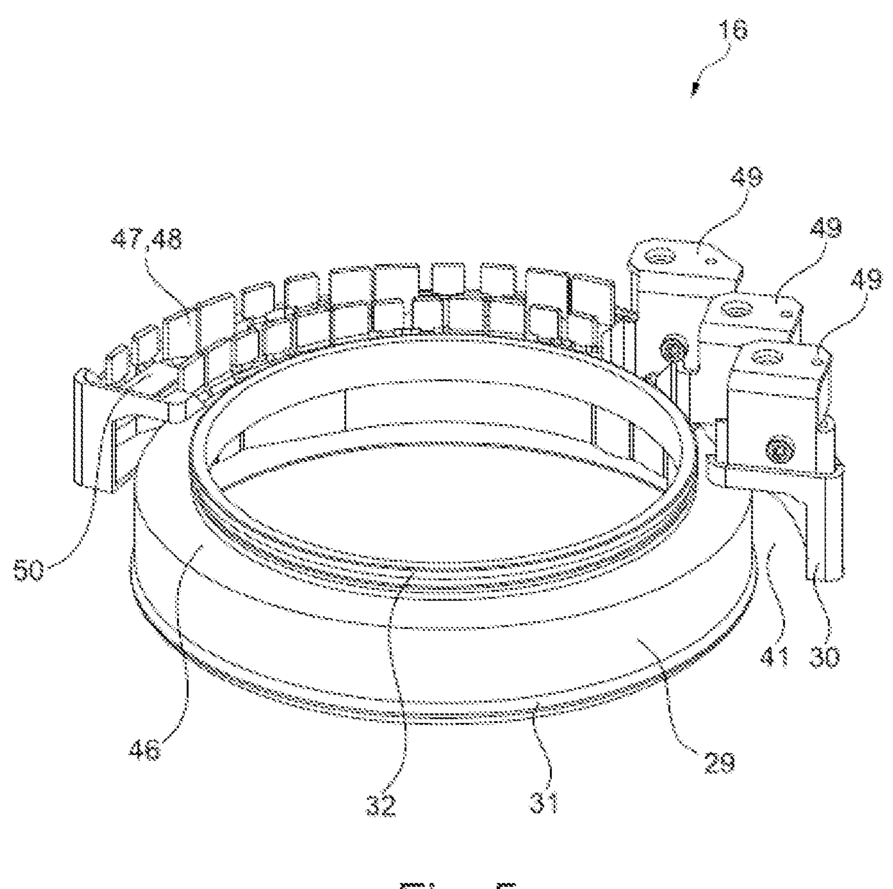
FIG. 5 shows a further view of the conductor support according to the disclosure with busbars and phase connections arranged on the conductor support section.

FIG. 5 shows a further perspective view of the conductor support 16. In this view, busbars 47 are inserted in the receiving sections 37, of which several welding lugs 48 are recognizable in each case, which protrude from the conductor support section 30 in the axial direction. The receiving sections 37 form positioning areas for the busbars 47, so that there is a defined association between the welding lugs 48 and the conductor ends of the phase windings to be connected.

Also shown are three phase connections 49, via which the winding strands of the stator winding 5 forming a three-phase winding can be connected. A star point rail 50 is also arranged between the welding lugs 48 of the busbars 47, which connects the different phases of the stator winding 5 in a star connection.

Figure 6:
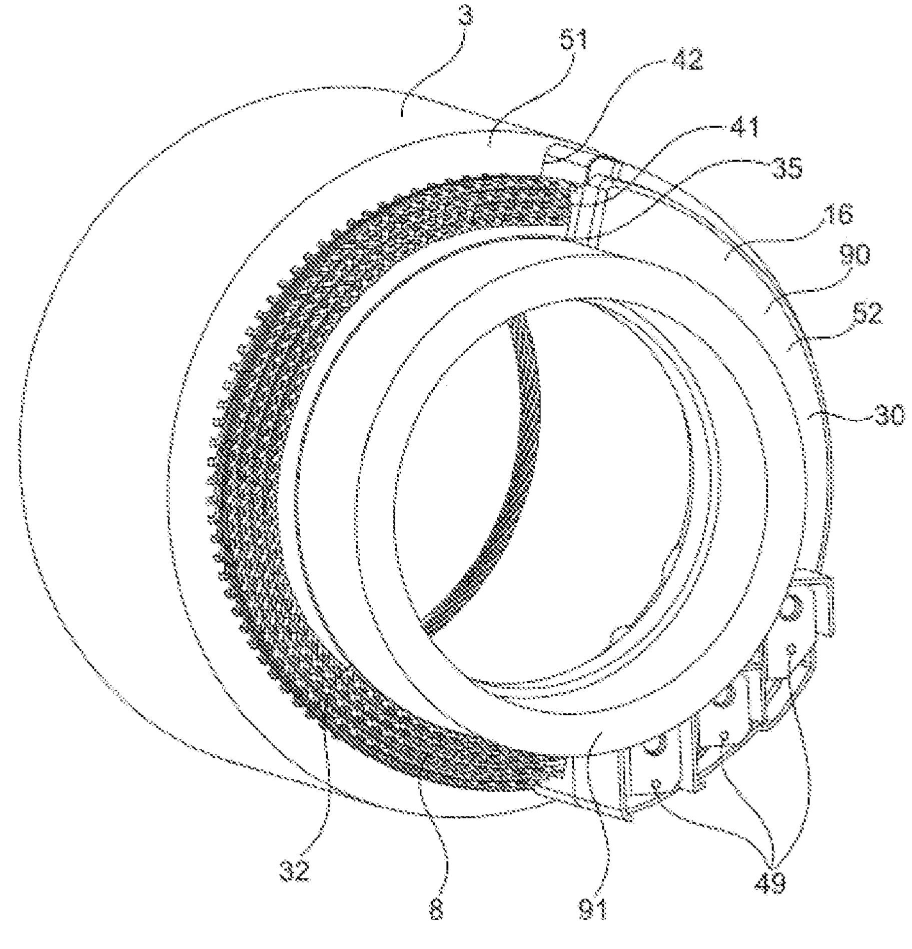
FIG. 6 shows the arrangement of the conductor support according to the disclosure on the stator of the electric machine according to the disclosure.

FIG. 6 shows the conductor support 16 in its mounting position on the stator 3. The conductor support 16 is arranged at the first axial end 7 of the stator 3. It can be seen that the axial contact surface 42 of the conductor support 16 is in contact with an end face 51 of the stator 3. The winding head 8, which projects outwards in the axial direction from the axial end face 51 of the stator 3, runs inside the conductor support section 30 in the receiving space 41. The axially outward-facing side of the conductor support section 30 is covered by a cover element 52, which is in contact with the section 35 of the second seal 32 with a ring-segment-shaped contact surface on its inner diameter.

To this end, the cover element 52 comprises a ring-segment-shaped first section 90, which covers the conductor support section 30, and a ring-shaped second section 91, which extends along the second section 36 of the second seal 32. The cover element 52 lies against a section of the axial contact surface 42 on the conductor support 16. The cover element 52 is electrically insulating and can be designed, for example, as an injection-molded plastic component. It is also possible that the first section 90 and the second section 91 are manufactured as separate components or cover elements and/or that the second section 91 is designed as a part of the bearing shield 10 and/or the housing 2.

This means that only the phase connections 49 are accessible from the outside of the conductor support section 30 once the cover element 52 has been positioned. The phase connections 49 remain accessible from the outside even after the conductor support 16 has been arranged on the bearing shield 10, so that the electric machine 1 can be powered via the phase connections 49. For this purpose, further seals and/or sealing elements (not shown) can be provided in the area of the phase connections 49, which also seal the wet space 13 at the phase connections 49.

Figure 7:
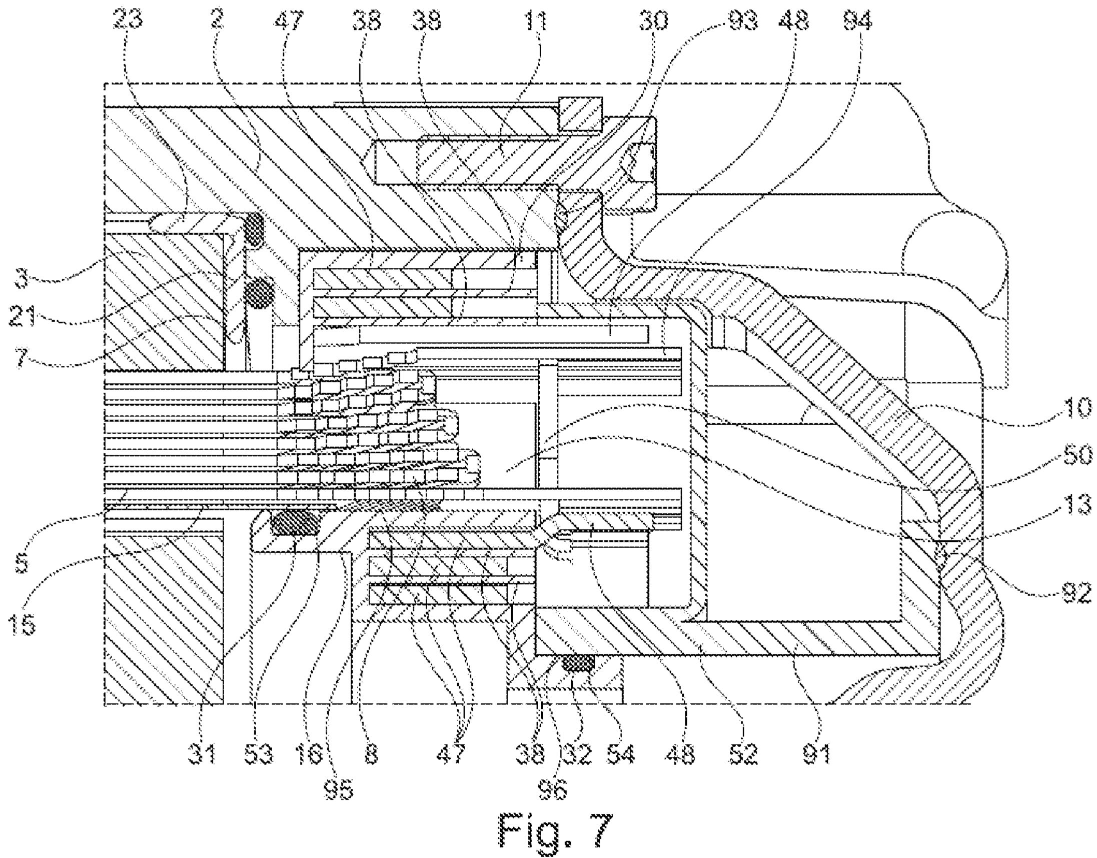
FIG. 7 shows a sectional view of the axial end of the exemplary embodiment of the electric machine according to the disclosure with the conductor support according to the disclosure.

FIG. 7 shows a sectional view of a section of the electric machine 1. The conductor support 16 can be seen between the stator 3 and the bearing shield 10. The conductor support 16 is in contact with the sealing element 15 via the first seal 31. The conductor support 16 is in contact with the cover element 52 via the second seal 32. The cover element 52 is in turn supported on the bearing shield 10 and sealed there, for example by a seal 92. The bearing shield 10 is sealed against the housing 2 at the radially outer end by a seal 93 arranged adjacent to the screw connection 11.

The first seal 31 is in contact with the sealing element 15 from the radial inside. The second seal 32 is also in contact with the cover element 52 from the radial inside. The conductor support 16 is advantageously arranged inside the electric machine 1 via two cylindrical surfaces 95, 96 of the sealing section 29, on which one of the seals 31, 32 is arranged. These cylindrical surfaces 95, 96 can advantageously be processed in the same process step or in the same clamping of the conductor support 16, so that a precise alignment of the conductor support 16 can be achieved, particularly in combination with the anti-rotation device described above. The precise alignment improves the sealing function of the conductor support 16 created by the overlap. In addition to a radially internal seal, the sealing element 15 can also be sealed by the first seal 31 from the radial outside. Alternatively, an axial seal or a seal similar to a radial or axial seal of the conductor support 16 on the sealing element 15 and/or on the cover element 52, the bearing shield 10 and/or a section of the housing 2 is also possible.

As can be seen, the wet space 13 is sealed by the sealing section 29 of the conductor support 16, the cover element 52 and the bearing shield 10. In addition to the winding head 8 of the stator winding 5, the busbars 47 and the star point rail 50, which run in the conductor support section 30 of the conductor support 16, are also arranged within the wet space 13, so that they can advantageously also be cooled via a coolant circulating in the wet space 13. The connection between two of the welding lugs 48 and one conductor end 94 of a phase winding of the stator winding 5 can also be seen.

Sufficient electrical insulation of the electric machine 1 in the area of the conductor support 16 is achieved by making the sealing section 29 and the conductor support section 30 from an electrically insulating material. The individual busbars 47 are additionally insulated from each other by the web sections 38, which protrude beyond the busbars 47 in their axial length. Sufficient gaps for insulation are provided between the star point rail 50 and the axially outer end of the winding head 8. The cover element 52, which surrounds at least the conductor support section 30, is also made of an electrically insulating material and ensures the insulation in particular between the welding lugs 48 and the bearing shield 10, which can be made of an electrically conductive material such as a metallic material. The conductor support 16 can advantageously ensure insulation of the housing 2, the bearing shield 10 and the rotor 25, which may be electrically conductively connected to other components via a shaft, even in the event of a defect in the winding insulation of the stator winding 5.

Figure 8:
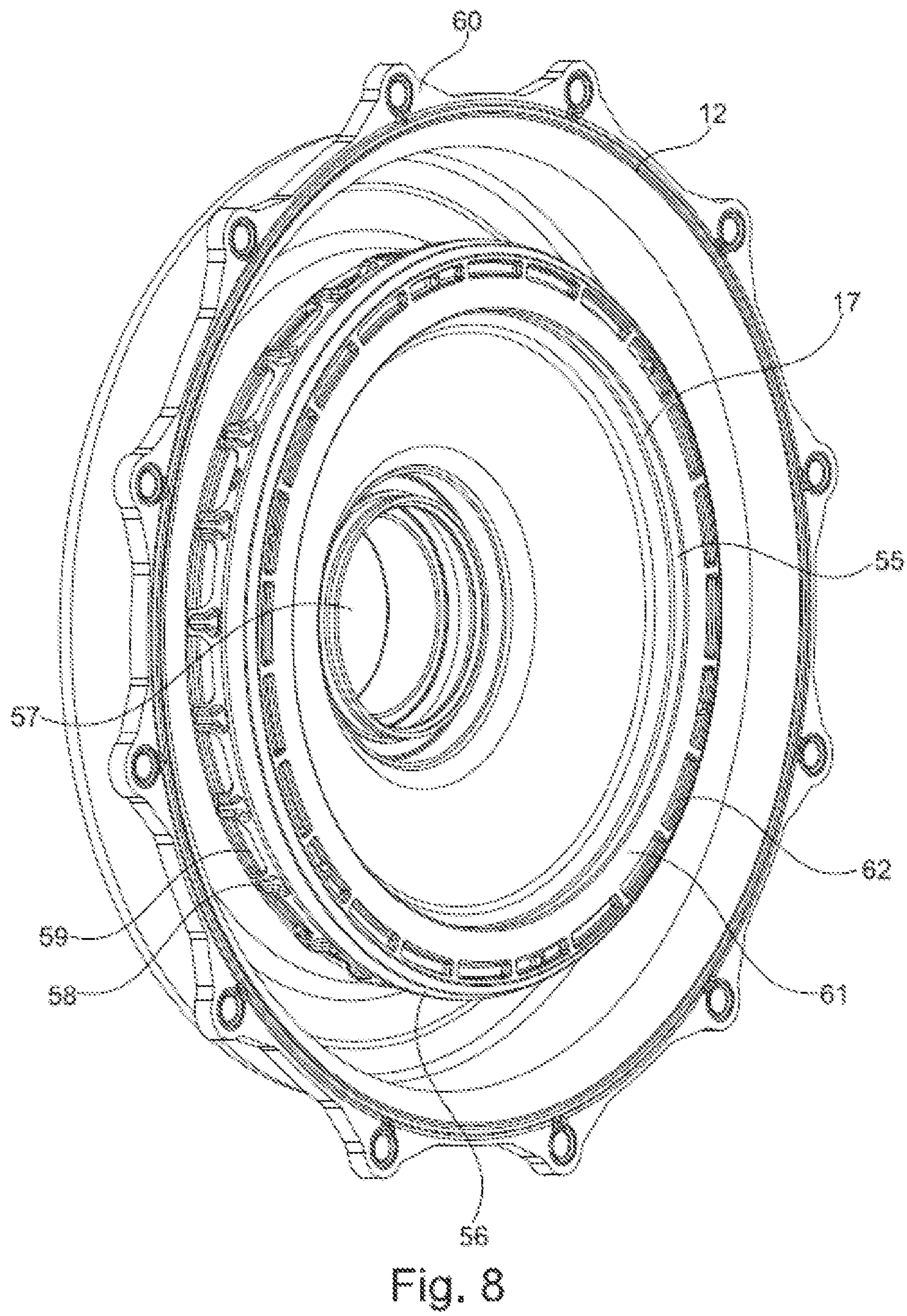
FIG. 8 shows a perspective view of a bearing shield of the electric machine according to the disclosure with an exemplary embodiment of a seal carrier according to the disclosure.

FIG. 8 shows a detailed view of the bearing shield 12 arranged in the area of the second axial end 7 of the stator 3. An exemplary embodiment of a sealing arrangement 17 is arranged on the bearing shield 12. The sealing arrangement 17 comprises a ring-shaped seal carrier 55, which comprises at least one seal 56, with which the sealing arrangement 17 is in contact with the sealing element 15, which seals the stator 3 against the radially inner air gap 14. The seal 56 runs along the outer circumference of the ring-shaped seal carrier 55 and thus is in contact radially on the inside of the sealing element 15 of the electric machine 1. The ring-shaped seal carrier 55 is arranged concentrically around an opening 57 of the bearing shield 12, in which a rotor shaft of the electric machine 1 can be received. The sealing arrangement 17 seals the wet space 13 from the rotor 25 arranged in the dry interior of the electric machine 1.

The seal carrier 55 is attached to the bearing shield 12 in a form-fitting and force-fitting manner and, for this purpose, comprises a plurality of latching elements 58 which are arranged offset in the circumferential direction and protrude in the axial direction and which engage in corresponding receptacles 59 of the bearing shield 12. The latching elements 58 are in particular arranged equidistantly along the outer circumference of the seal carrier 55, so that it is possible to attach the seal carrier 55 to the bearing shield 12 stably and securely. The latching elements 58 are shaped like a hook or claw, so that the seal carrier 55 can be clipped to the bearing shield 12 in the axial direction during mounting of the electric machine 1. The seal carrier 55 consists in particular of an electrically insulating material in order to increase an insulation distance between the bearing shield 12 and the winding head 8 at the second axial end 9 of the stator 3.

The bearing shield 12 is attached via radially outward-facing attachment sections 60 of the bearing shield 12, which enable a connection to the housing 2 of the electric machine 1 via the screw connections 11 shown in FIGS. 1 and 2. The attachment sections 60 protrude radially outwards on a face side of the bearing shield 12 that faces the second axial end 9 of the stator 3 in the mounting position.

The side 61 of the sealing element 55 facing the stator 3 comprises a plurality of recesses 62 arranged offset in the circumferential direction. These recesses 62 serve to achieve a material thickness of the seal carrier 55 that is as homogeneous as possible, so that, for example, production of the seal carrier 55 in an injection molding process is made easier. For example, the injection points for the injection molding process can also be arranged in the recesses 62, so that the side 61 facing the stator 3 can be made flat, in particular without further post-processing. This ensures that the seal carrier 55 does not come into contact with the rotor 25 of the electric machine 1, which rotates during operation. As an alternative to an injection molding process, the use of other manufacturing processes, for example milling from solid material, for the production of the seal carrier 55 is also conceivable.

Figure 9:
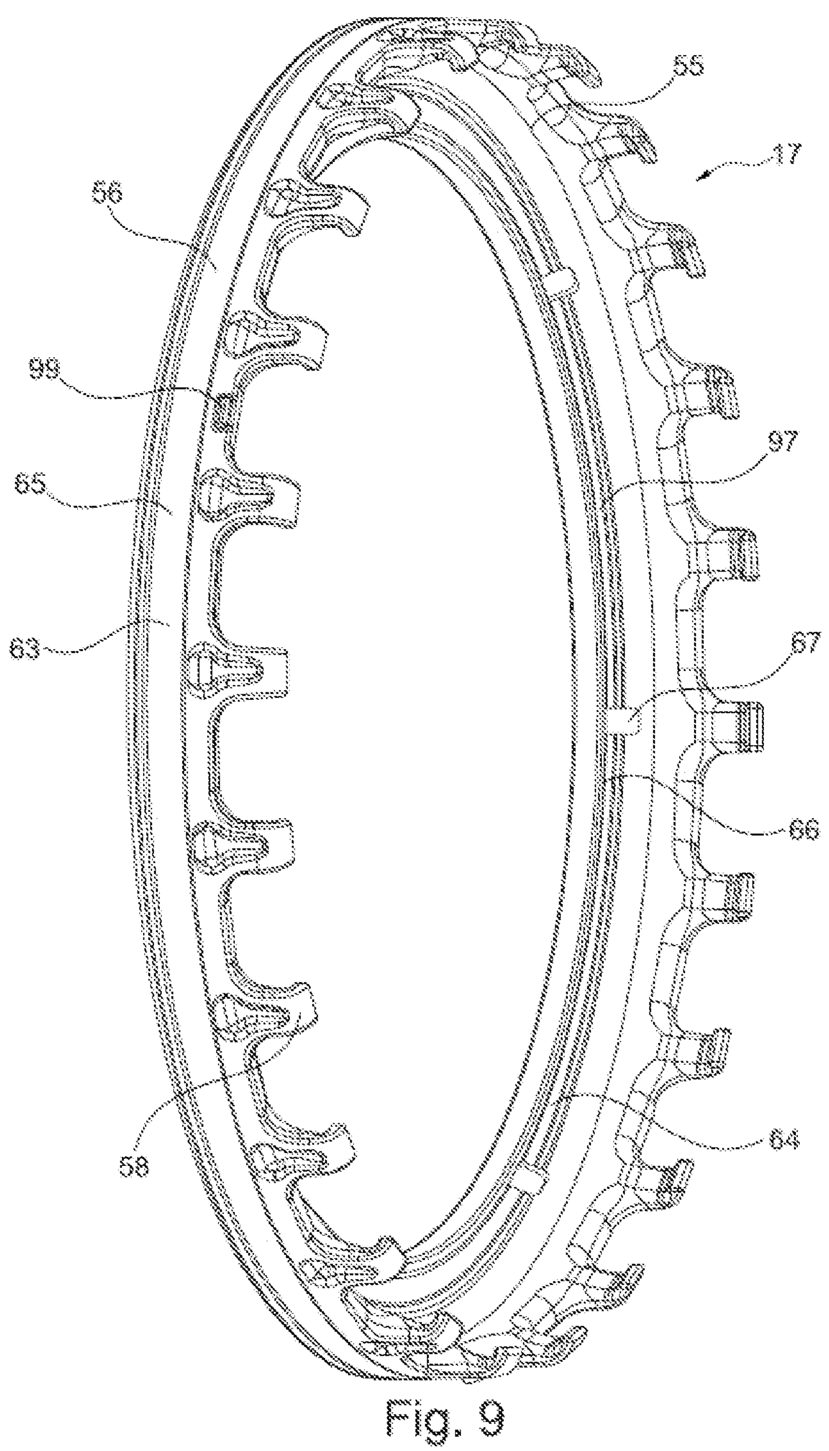
FIG. 9 shows a view of the exemplary embodiment of the seal carrier according to the disclosure.

FIG. 9 shows the seal carrier 55. It can be seen that the latching elements 58 are arranged equidistantly around the outer circumference on a face side of the sealing element 55. Furthermore, the seal 56 can be seen, which runs along the cylinder cladding-shaped outer circumference of the sealing element 55. The seal 56 comprises a first sealing section 63, which is arranged on the outer circumference of the seal carrier 55 and serves to seal against the sealing element 15 running inside the stator 3.

Furthermore, the seal 56 comprises a second sealing section 64, which is arranged on the inner circumference of the seal carrier 55 and serves to seal the seal carrier 55 against the bearing shield 12. The second sealing section 64 extends along a ring-shaped disk-shaped centering surface 97, with which the seal carrier 55 is in contact with the bearing shield 12 and via which precise alignment of the seal carrier 55 and in particular also of the seal 56 or its first sealing section 63 in contact with the sealing element 15 is made possible during assembly of the electric machine 1.

The first sealing section 63 and the second sealing section 64 can be manufactured, for example, in an injection molding process. For example, an elastomer can be injected into ring-shaped grooves 65, 66 of the seal carrier 55 and then baked or cured. In order to enable the first sealing section 63 and the second sealing section 64 to be injected together, the groove 65 and the groove 66 can be connected by one or a plurality of connecting sections 67, so that when the seal carrier 55 is inserted into a mold, simultaneous injection of the first sealing section 63 and the second sealing section 64 of the seal 56 is enabled. The grooves 65, 66 are correspondingly connected via the connecting sections 67, so that the injected sealant can form the desired sealing sections 63, 64 in both grooves 65, 66.

In order to limit the axial displaceability of the sealing element 15 resting on the seal 56 or its first sealing section 63, the seal carrier 55 has a stop 99 formed from several radial elevations, which axially fixes the sealing element 15. Alternatively, it is also possible for the stop 99 to be formed by a single, ring-shaped or ring-segment-shaped, radial elevation.

Figure 10:
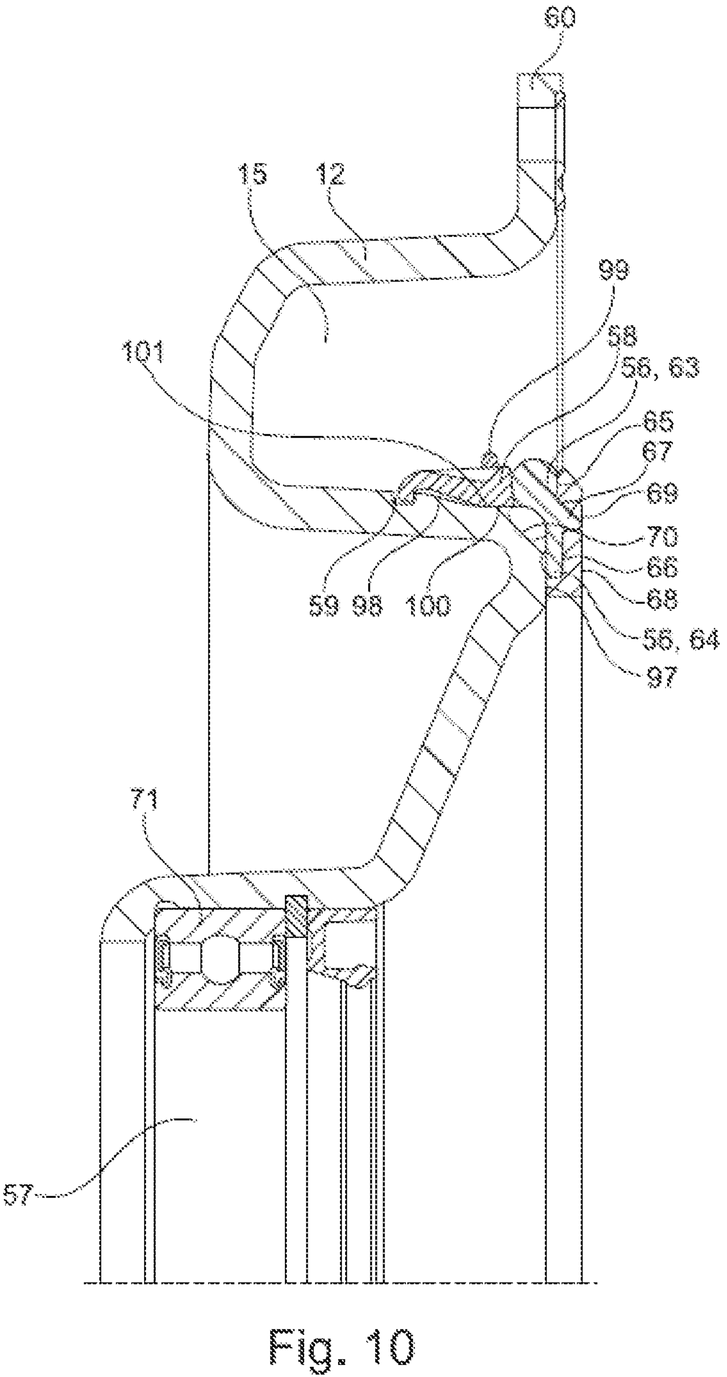
FIG. 10 shows a sectional view of the seal carrier according to the disclosure arranged on the bearing shield.

FIG. 10 shows a sectional view through the bearing shield 12 and the sealing arrangement 17, wherein a rotor bearing 71, on which a shaft (not shown) connected to the rotor 25 of the electric machine 1 can be mounted against the bearing shield 12, is also shown in the area of the opening 57. It can be seen that the first sealing section 63 of the seal 56 extends through the groove 65 and the second sealing section 64 extends through the groove 66. The grooves 65 and 66 are connected to one another in a communicating manner by the connecting section 67, wherein the connecting section 67 has an opening 69 on the radially inward-facing side 68 of the seal carrier 55, via which, for example, the sealing material can be injected into the grooves 65, 66 and the connecting section 67. This makes it possible to arrange the molding area for the seal 56, which is critical for the installation space, in a recessed area of the seal carrier 55. In addition to injecting the seal 56, other methods of applying the seal 56 with the first sealing section 63 and the second sealing section 64 may be used, such as metering with a needle or the like.

The engagement of the hook-shaped latching element 58 in the corresponding receptacle 59 on the bearing shield 12 can also be seen. The latching elements 58 can, for example, be made of plastic and be designed to be resilient, so that the seal carrier 55 can be clipped onto the bearing shield 12 and, in particular, a preload in the first sealing section 63 for sealing against the bearing shield 12. The bearing shield 12 has a ramp-shaped section 98 in the axial direction in front of the receptacle 59, so that the hook-like or claw-like shaped latching elements 58 are spring-loaded onto the bearing shield 12 in the axial direction when the seal carrier 55 is pushed on and then snapped into the receptacle 59. The radial position of the seal carrier 55 is defined by a cylindrical surface 100 of the bearing shield 12 and the cylindrical surface 101 of the seal carrier 55 adjacent to it.

The arrangement of the seal carrier 55 to hold the seal 56 has the advantage that the bearing shield 12 can be manufactured, for example, as a stamped sheet metal component. The use of the separate seal carrier 55 makes it possible, on the one hand, to arrange an insulating material in the area which is particularly close to the stator 3 or particularly close to the winding head 8 and thus improve the insulation between the stator 3 or the stator winding 5 and the bearing shield 12. For example, an axial distance and a radial distance between the winding head 8 and the bearing shield 12 of at least 2.5 mm each can be maintained in this way. On the other hand, the sealing distance between the axial seals on the sealing element 15 of the electric machine 1 can be reduced, since the axial seal 56, or its first section 63, can be arranged closer to the face side of the stator 3 with the aid of the seal carrier 55, since the arrangement is not influenced by a curvature of the bearing shield 12 in an area 70, which can occur as a result of the process during manufacture as a sheet metal stamped part. The seal carrier 55 can advantageously avoid the arrangement of a seal directly on the bearing shield 12 or in the curved section 70 of the bearing shield 12.

During operation of the electric machine 1, the pressure of the cooling medium in the wet space 13 can act on the outer diameter of the sealing element 15, which is designed, for example, as a slot tube, which is why it can tend to bulge inwards towards the rotor 25. The direction of this bulging is shown in FIG. 1 by an arrow 102. The sealing points 103 and 104 are also shown, wherein the first sealing section 63 of the seal carrier 55 seals against the sealing element 15 at the sealing point 103 and the first seal 31 of the conductor support 16 at the sealing point 104. The axial position of the sealing points 103, 104 is indicated by a dotted-dash line. A reduced axial distance between the sealing points 103 and 104, at which the sealing element 15 is radially supported, advantageously stiffens the sealing element 15 against this radial bulging, so that undesirable contact between the sealing element 15 and the rotor 25 or an increased material thickness of the sealing element 15 required for stiffening can be advantageously avoided. In addition to the sealing of the sealing element 15 via the seal 56 from the radial inside as shown in FIG. 10, sealing from the radial outside is also conceivable.

Figure 11:
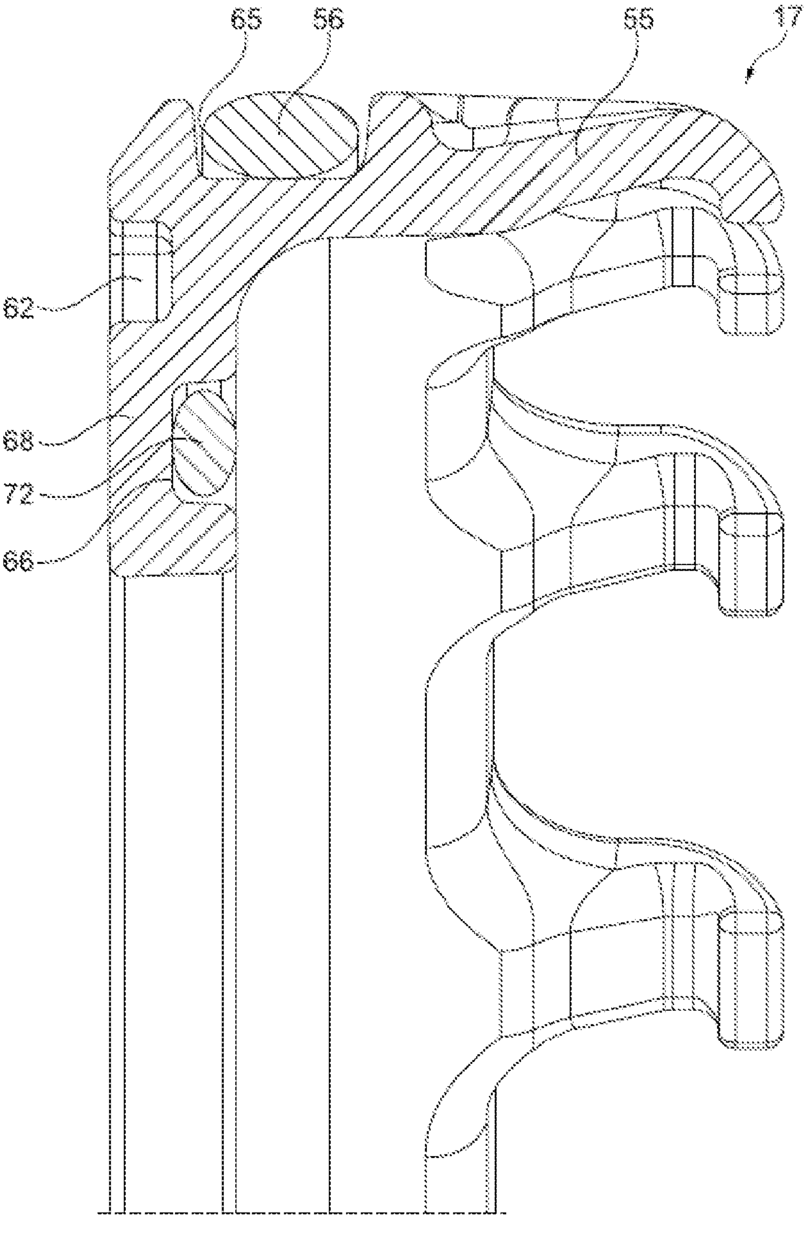
FIG. 11 shows a detailed view of a further exemplary embodiment of a seal carrier according to the disclosure for an electric machine according to the disclosure.

FIG. 11 shows an alternative exemplary embodiment of the sealing arrangement 17. In this exemplary embodiment, the conductor support 55 comprises a further seal 72 in addition to the seal 56. The seal 56 is designed as an O-ring, which is arranged in the groove 65 in the outer circumference of the seal carrier 55. The seal carrier 55 is sealed via the seal 56 relative to the sealing element 15 inside the stator 3 as described above.

In the alternative exemplary embodiment, the seal against the bearing shield 12 is provided by a further seal 72, which is arranged accordingly in the radially inner groove 66 of the seal carrier 55. The further seal 72 is also designed as an O-ring, so that the connecting sections 67 that communicate with the grooves 65, 66 can advantageously be dispensed with. The sectional view also shows one of the recesses 62, which clearly enables the effect of a material thickness that is as homogeneous as possible in the cross-section of the seal carrier 55.

Figure 12:
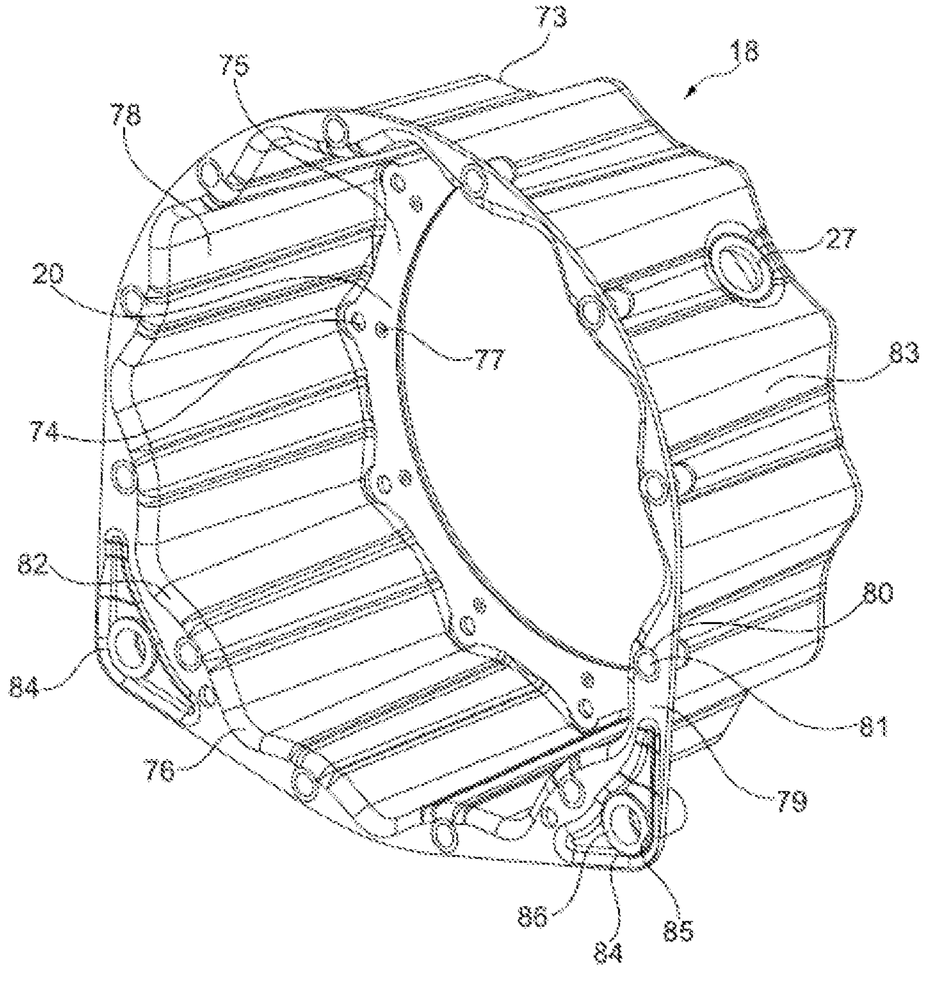
FIG. 12 shows a perspective view of a transmission connection element of an electric machine according to the disclosure.

FIG. 12 shows a detailed view of the transmission connection element 18. The transmission connection element 18 can be hollow cylindrical and, in the mounting position, arranged concentrically around the longitudinal axis 6 extending in the axial direction of the electric machine 1. On a first end face 73, the transmission connection element 18 comprises the ring-shaped or alternatively ring-segment-shaped attachment section 20, via which the transmission connection element 18 is connected along the attachment plane 19 to the end face of the housing 2 and to the stator 3.

In an alternative embodiment, it is possible that the housing 2 is attached to the attachment plane 19 and that the attachment of the stator 3 is attached to a further attachment plane (not shown). Attachment to two attachment planes, in particular those orientated parallel to each other, can be achieved, for example, by the attachment section 20 having two axially offset attachment surfaces to which the stator 3 and the housing 2 can be attached with an axial offset to each other and in particular along two attachment planes extending parallel to each other and orthogonal to the axial direction.

The transmission connection element 18 extends from the attachment plane 19 to the side of the attachment plane 19 opposite the housing 2 and, in this case, also opposite the stator 3, as shown, for example, in FIGS. 1 and 2. The attachment section 20 of the transmission connection element 18 projects radially inwards from a particularly hollow cylindrical cladding 78 of the transmission connection element 18. A plurality of openings 74 are provided in the attachment section 20, via which the transmission connection element 18 can be connected to the housing 2 of the electric machine 1 by means of the screw connections 11. The bearing shield 12 can also be attached to the housing 2 via the screw connections 11 or the openings 74. The bearing shield 12 is in contact with the side 75 of the attachment section 20 opposite the attachment plane 19 and is thus arranged in the cavity inside the transmission connection element 18 or at least partially surrounded by the transmission connection element 18. A seal (not shown) can be arranged between the attachment section 20 and the bearing shield 12. The opening 27 is provided in the cladding surface of the cladding 78, in which the connection element 26 in the form of a coolant nozzle and, if necessary, a sealing ring can be arranged as described above.

In the assembled state of the electric machine 1, the stator 3 of the electric machine 1 is attached to the attachment section 20 of the transmission connection element 18 via the end face 76 pointing towards the attachment plane 19 by means of an adhesive connection. The attachment section 20 of the transmission connection element 18 can advantageously provide a flat attachment surface for the adhesive connection to the stator 3, in particular to the insulation ring 21 on the end face at the second axial end 9 of the stator 3. Due to the adhesive connection with the attachment section 20, the stator 3 is arranged in a torque-resistant manner inside the housing 2 of the electric machine 1. The attachment section 20 of the transmission connection element 18 thus provides torque support for the stator 3 of the electric machine 1. Furthermore, this adhesive connection and a seal arranged between the bearing shield 12 and the attachment section 20 contribute to sealing the wet space 13 against the rotor 25 and the surroundings of the electric machine 1. The attachment section 20 also effects an axial positioning of the transmission connection element 18 on the housing 2 or on the stator 3.

In order to provide a defined gap for the adhesive of the adhesive connection to the stator 3, the attachment section 20 comprises a plurality of spacing projections 77 on the end face 76 facing the stator 3, which are arranged, for example, equidistantly around the circumference of the attachment section 20. These spacing projections 77 are designed, for example, as knobs or the like and cause the creation of a defined gap on the attachment plane 19, so that an adhesive for the adhesive connection to the stator 3 can be introduced in a defined geometry and quantity between the attachment section 17 and the stator 3. To improve the formation of the adhesive connection between the stator core 4 and the attachment section 20 of the transmission connection element 18, for example, the plastic insulation ring 21 can be plasma-activated, for example.

To attach a transmission to the transmission connection element 18 and to attach the transmission connection element 18 and possibly the entire electric machine 1 to a third object such as a motor vehicle, the transmission connection element 18 has a further attachment section 79 on the end face opposite the attachment section 20. This protrudes radially outwards from the hollow cylindrical cladding 78 of the transmission connection element 18.

The further attachment section 79 comprises a plurality of openings 80 for receiving attachment means. For example, rivet nuts 81 can be provided in the openings 80, which enable a transmission to be attached to the transmission connection element 18. The plurality of openings 80 of the further attachment section 79 are offset in the circumferential direction and are exemplarily arranged equidistantly.

The cladding 78 of the transmission connection element 18 comprises a plurality of radial bulges 82, which each come into contact adjacently with the openings 74 of the attachment section 20. This makes it possible for a screwing tool to be guided to the attachment means arranged in the openings 74 for attaching the bearing shield 12 to the transmission connection element 18 and for attaching the transmission connection element 18 to the housing 2 of the electric machine 1. Due to the radial bulges 82, radial indentations 83 are also created, which are correspondingly adjacent to the openings 80 of the further attachment section 79. This allows a riveting tool to be guided to the ring-shaped attachment section 79 from both sides, e.g., for riveting in the rivet nuts 81.

The further attachment section 79 comprises additional attachment areas 84, via which the transmission connection element 18 or the entire electric machine 1 can be attached to a third object such as a motor vehicle. The additional attachment sections 84 each comprise an opening 85, in which a rivet nut 86 is also arranged.

The transmission connection element 18 is made in particular from a metal sheet, for example by deep drawing or stamping. This enables simple production of the transmission connection element 18, which can therefore be manufactured separately from the housing 2, which is designed, for example, as a cast aluminum component. This facilitates the production of the electric machine 1. The sheet metal thickness of the transmission connection element 18 can in particular be between 1 mm and 5 mm, for example 3 mm.

Figure 13:
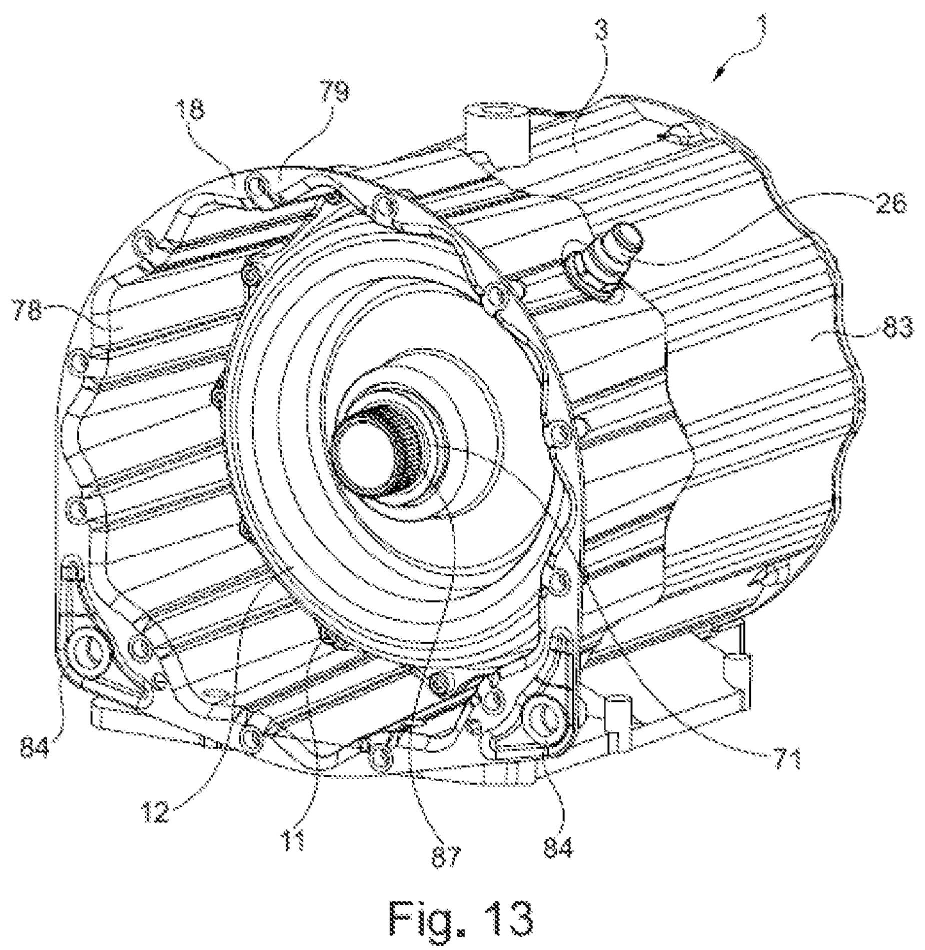
FIG. 13 shows a perspective view of the transmission connection element mounted on the electric machine according to the disclosure.

In FIG. 13, the transmission connection element 18 is shown in the mounted position on the housing 2 of the electric machine 1. Furthermore, the connection element 26 inserted into the opening 27 is shown. The bearing shield 12 is arranged inside the cladding 78 of the transmission connection element 18. It can be seen that the bearing shield 12 is fastened via the screw connections 11 and the side 75 of the attachment section 20 arranged opposite the attachment plane 19. Also shown is a rotor shaft 87, which is guided through the opening 57 of the bearing shield 12 and is rotatably mounted there via the rotor bearing 71. A transmission attached to the electric machine 1 via the transmission connection element 18 can be coupled to this rotor shaft 87.

The housing 2 forms the starting point for an assembly sequence of the electric machine 1, which can be seen in FIG. 2, for example. A stator sub-assembly comprising the stator 3, the stator winding 5, the insulation rings 21, 22, the centering sleeves 23, 24 and the sealing element 15 is first inserted axially from a first direction into the housing 2. Insertion takes place via the end face of the housing 2 shown on the left in FIG. 2, which is adjacent to the second axial end 9 of the stator 3 when the electric machine 1 is mounted.

Before or after this, an adhesive, such as an epoxy resin, is applied to at least one of the two contact partners for the connection between the insulation ring 21 and the attachment section 20 of the transmission connection element 18. The transmission connection element 18 is then centered on the insulation ring 21. By axially inserting the bearing shield 12 and screwing it together to the housing 2, an axial force is finally applied between the transmission connection element 18 and the insulation ring 21, which is required to form the adhesive connection. The remaining motor components, substantially the rotor 25, the conductor support 16 and the bearing shield 10, can then be mounted from the opposite, second axial direction. Alternatively, the other motor components can also be mounted at an earlier stage.

The stator torque can be transmitted during operation of the electric machine 1 via the first adhesive connection between the stator core 4 and the insulation ring 21 to the insulation ring 21 and from there via the second adhesive connection to the attachment section 20 of the transmission connection element 18, which acts as a thrust washer. From there, the stator torque can be transferred further to the screw connection 11 through the attachment means 11 and finally into the housing 2 as intended.

In the fully assembled electric machine 1, basic insulation is created between the stator core 4 and the housing 2 or the transmission connection element 18 fixed to the housing 2 by the insulation rings 21, 22, the centering sleeves 23, 24 and the sufficiently dimensioned air gap 14 and creepage distance generated as described above.

In an alternative embodiment of the electric machine 1, the conductor support 16, the seal carrier 55 and the transmission connection element 18, it is possible for an external rotor to be arranged on the stator 3 and for the sealing element 15 to be arranged radially on the outside of the stator 3. In such a case, the sealing element 15 can also be sealed as described above.

LIST OF REFERENCE SIGNS

1 Electric machine
2 Housing
3 Stator
4 Stator core
5 Stator winding
6 Longitudinal axis
7 First axial end
8 Winding head
9 Second axial end
10 Bearing shield
11 Screw connection
12 Bearing shield
13 Wet space
14 Air gap
15 Sealing element
16 Conductor support
17 Sealing arrangement
18 Transmission connection element
19 Attachment plane
20 Attachment section
21 Insulation ring
22 Insulation ring
23 Centering sleeve
24 Centering sleeve
25 Rotor
26 Connection element
27 Opening
28 Opening
29 Sealing section
30 Conductor support section
31 First seal
32 Second seal
33 First axial end
34 Second axial end
35 Section
36 Section
37 Receiving section
38 Web section
39 Outer area
40 Inner area
41 Receiving space
42 Axial contact surface
43 External section
44 Cutout
45 Centering aid
46 Axial support surface
47 Busbar
48 Welding lug
49 Phase connection
50 Star point rail
51 End face
52 Cover element
53 Groove
54 Groove
55 Seal carrier
56 Seal
57 Opening
58 Latching element
59 Receptacle
60 Attachment section
61 Side
62 Recess
63 First sealing section
64 Second sealing section
65 Groove
66 Groove
67 Connecting section
68 Side
69 Opening
70 Area
71 Rotor bearing
72 Seal
73 End face
74 Opening
75 Side
76 End face
77 Spacing projection
78 Cladding
79 Attachment section
80 Opening
81 Rivet nut
82 Radial bulge
83 Radial indentation
84 Attachment area
85 Opening
86 Rivet nut
87 Rotor shaft
88 Section
89 Sealing element
90 First section
91 Second section
92 Seal
93 Seal
94 Conductor end
95 Cylindrical surface
96 Cylindrical surface
97 Centering surface
98 Ramp-shaped section
99 Stop
100 Cylindrical surface
101 Cylindrical surface
102 Arrow
103 Sealing point
104 Sealing point

The invention claimed is:

1. An electric machine comprising a stator and a conductor support arranged at an axial end of the stator, wherein the conductor support comprises a ring-shaped sealing section and a conductor support section extending radially outward from the ring-shaped sealing section and configured to support at least one busbar of the electric machine, wherein the sealing section has a first seal axially facing the stator and a second seal axially facing away from the stator, and wherein the first seal is in contact with a sealing element arranged on the stator and sealing the stator against a radially adjacent air gap, and at least sections of the second seal are in contact with at least one cover that at least partially surrounds at least one of the conductor support section and the axial end of the stator.

2. The electric machine of claim 1, wherein the second seal is one of:

in contact with a cover element covering the conductor support section and at least a section of the axial end of the stator; and in contact with a section of the cover element surrounding the conductor support section and with at least one section of at least one of a housing and a bearing shield of the electric machine.

3. The electric machine of claim 1, wherein the stator has at least one stator winding, wherein a wet space is sealed at the axial end of the stator via the sealing element and the sealing section of the conductor support, and wherein the stator windings and at least one conductor arranged on the conductor support are disposed within the wet space.

4. The electric machine of claim 1, wherein the first seal and the second seal are at least one of ring-shaped and arranged in respective ring-shaped grooves of the sealing section.

5. The electric machine of claim 1, wherein the first seal and the second seal are O-rings.

6. The electric machine of claim 1, wherein at least one of the conductor support section and the sealing section consists of an electrically insulating plastic material.

7. The electric machine of claim 1, wherein the conductor support section has a plurality of radially adjacent receiving sections, and wherein the at least one busbar is arranged in each of the plurality of radially adjacent receiving sections.

8. The electric machine of claim 7, wherein two adjacently arranged receiving sections are each separated by a web section extending in the axial direction, wherein the web section protrudes in the axial direction over busbars arranged in the receiving sections.

9. The electric machine of claim 1, wherein the conductor support section has at least one phase connection.

10. A conductor support of an electric machine, comprising:

a ring-shaped sealing section having a first seal configured to contact a sealing element that is arranged on a stator and seal the stator against a radially adjacent air gap, and a second seal that is axially offset from first seal and configured to contact at least one cover that is configured to at least partially surround an axial end of the stator; and a conductor support section extending radially outward from the ring-shaped sealing section and configured to support at least one busbar of the electric machine.

11. The conductor support of claim 10, wherein the conductor support section is configured to be at least partially surrounded by the at least one cover of the electric machine.

12. The conductor support of claim 10, wherein the conductor support section is a ring-shaped conductor support section.

13. The conductor support of claim 10, wherein the conductor support section is a ring-segment-shaped conductor support section.

14. The conductor support of claim 10, wherein the first seal is positioned radially outward of the second seal.

15. The conductor support of claim 10, wherein the first and second seals are O-rings.

16. The conductor support of claim 15, wherein the first and second seals are injection molded seals.

17. The conductor support of claim 10, wherein the conductor support section is formed of an electrically insulating plastic material.

18. The conductor support of claim 17, wherein the sealing section is formed of an electrically insulating plastic material.

* * * * *